(12) United States Patent
Tankersley

(10) Patent No.: US 11,969,083 B2
(45) Date of Patent: Apr. 30, 2024

(54) TABLE BASE AND METHOD

(71) Applicant: Ann G. Tankersley, Columbus, GA (US)

(72) Inventor: Ann G. Tankersley, Columbus, GA (US)

( * ) Notice: Subject to any disclaimer, the term of this patent is extended or adjusted under 35 U.S.C. 154(b) by 0 days.

(21) Appl. No.: 17/938,295

(22) Filed: Oct. 5, 2022

(65) Prior Publication Data

US 2023/0125448 A1   Apr. 27, 2023

Related U.S. Application Data

(60) Provisional application No. 63/272,161, filed on Oct. 26, 2021.

(51) Int. Cl.
*A47B 13/02* (2006.01)
*A47B 13/00* (2006.01)

(52) U.S. Cl.
CPC .......... *A47B 13/023* (2013.01); *A47B 13/003* (2013.01); *A47B 2013/024* (2013.01)

(58) Field of Classification Search
CPC ..... A47B 13/003; A47B 13/023; A47B 13/14; A47B 2013/024; A47B 2200/0022
See application file for complete search history.

(56) References Cited

U.S. PATENT DOCUMENTS

| | | | | |
|---|---|---|---|---|
| 2,981,578 A * | 4/1961 | Saarinen | ............ | A47B 13/023 108/150 |
| 3,230,909 A * | 1/1966 | Watson | ............ | A47C 9/00 108/150 |
| 6,471,168 B1 * | 10/2002 | Tseng | ............ | A47B 13/06 248/188 |
| 6,484,649 B1 * | 11/2002 | Wang | ............ | A47B 13/023 108/150 |
| 8,733,254 B1 * | 5/2014 | Wakefield | ............ | A47B 37/04 108/50.11 |
| 11,439,227 B1 * | 9/2022 | Tham | ............ | A47B 13/12 |
| 2005/0178300 A1 * | 8/2005 | Garfunkle | ............ | A47B 13/023 108/150 |
| 2009/0000529 A1 * | 1/2009 | Cheng | ............ | A47B 13/023 108/157.1 |
| 2012/0234212 A1 * | 9/2012 | Boirun | ............ | A47B 37/04 108/28 |
| 2017/0127824 A1 * | 5/2017 | Schneider | ............ | A47B 3/10 |
| 2019/0053616 A1 * | 2/2019 | Miller | ............ | A47B 37/00 |
| 2019/0335893 A1 * | 11/2019 | Erickson | ............ | A47B 37/04 |
| 2020/0229593 A1 * | 7/2020 | Kumar | ............ | A47B 13/003 |

(Continued)

FOREIGN PATENT DOCUMENTS

| | | | | |
|---|---|---|---|---|
| DE | 102006040594 A1 * | 3/2008 | ......... | A47B 13/003 |
| DE | 202009005669 U1 * | 11/2009 | ......... | G09F 7/18 |
| DE | 102019125591 A1 * | 3/2021 | | |

*Primary Examiner* — Daniel J Rohrhoff
(74) *Attorney, Agent, or Firm* — Perilla Knox & Hildebrandt LLP; Thomas B. Hildebrandt

(57) ABSTRACT

Disclosed are various embodiments for a table base. In one embodiment, a table base has a bottom surface portion configured to contact a supporting surface. The table base has a top surface portion configured to support and retain a smooth removable surface. The table base has an elongated shaft attached to the top surface portion and the bottom surface portion. The elongated shaft is tapered inward from the bottom surface portion and tapered outward to the top surface portion.

19 Claims, 9 Drawing Sheets

(56) References Cited

U.S. PATENT DOCUMENTS

| | | | | |
|---|---|---|---|---|
| 2020/0383502 A1* | 12/2020 | Omoto | .................. | A47B 13/12 |
| 2021/0401165 A1* | 12/2021 | Zhenni | .................. | A47B 37/04 |
| 2022/0142357 A1* | 5/2022 | Grabowski | .......... | A47B 13/023 |

* cited by examiner

TABLE BASE AND METHOD

CROSS-REFERENCE TO RELATED APPLICATIONS

This application claims the benefit of U.S. Provisional Application No. 63/272,161, titled "TABLE BASE AND METHOD," filed Oct. 26, 2021, the entire contents of which application is hereby incorporated herein by reference.

BACKGROUND

Many people have collections of china plates that are not used daily, and are hidden away in attics, displayed in china cabinets, or occasionally displayed hung on a wall or in a wall-mounted plate rack. Other than rare use on holidays or at large dinner parties, there is a desire to integrate them more usefully into their home décor. Interior Decorators often place a small side table next to each seating area in a room, in order to accommodate a drink, book, glasses, mobile phone, or plate of food.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
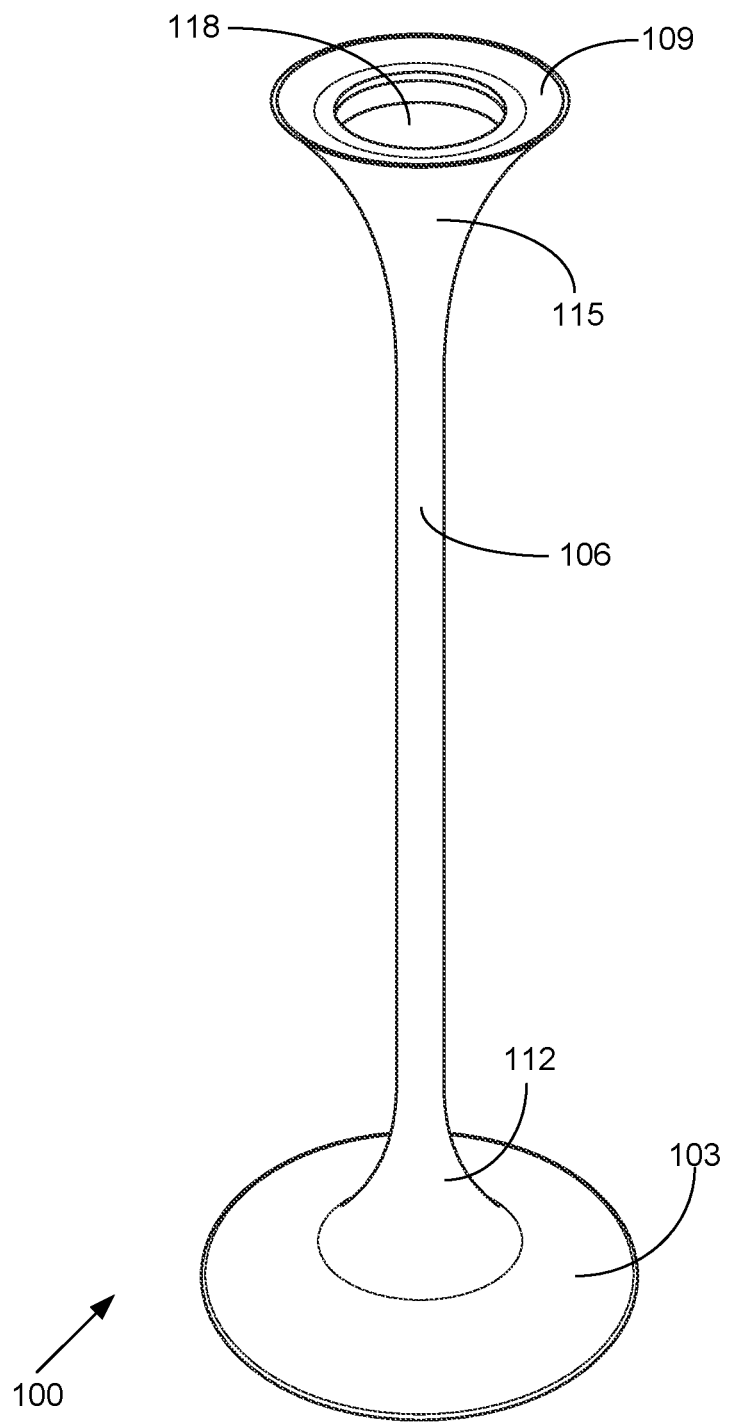
FIG. 1 is a perspective view of a table base according to one embodiment of the present disclosure.

The present disclosure relates to a table base that is configured to support and retain a plate functioning as a removable tabletop. FIG. 1 corresponds to a perspective view of a table base 100 according to one embodiment. The table base 100 comprises a bottom surface portion 103, an elongated shaft 106, and a top surface portion 109. The bottom of the bottom surface portion 103 may be configured to contact a floor surface or an earth surface, such as a turf surface, a dirt surface, a gravel surface, a mulch surface, and so on. The top surface portion 109 is configured to support a plate.

The elongated shaft 106 connects the bottom surface portion 103 and the top surface portion 109. In one embodiment, the elongated shaft 106 is tapered inward from the bottom surface portion 103 at region 112, and the elongated shaft 106 is tapered outward to the top surface portion 109 at region 115. In some examples, as shown, the taper may be non-linear. The top surface portion 109 may include a recessed cavity 118 for attaching and retaining a suction cup. The suction cup in turn attaches to and retains a plate or other smooth tabletop surface.

The table base 100 utilizes, for example, a china, ceramic, porcelain, or glass plate as the actual tabletop surface. In other examples, the table surface may support a glass tabletop surface or a polished stone tabletop surface in lieu of a plate.

The table base 100 is designed to support the plate in a manner that is elegant, sturdy, and causes no damage to the plate. The table base 100 is also designed to be easily interchanged with other plates as often as desired. To this end, the table base 100 may incorporate a removeable suction cup that may be attached to the bottom of the plate, and then a retainage element of the suction cup can be inserted into a recessed cavity 118 for form fit in the top surface portion 109 of the table base 100.

The table base 100 can be used as residential furniture, in outdoor events or for catering, in retailing, and so forth. The table base 100 with a corresponding plate tabletop may be used as side table that can be placed on any solid flooring, rug, or carpeted floor. For example, the table may be used next to each sofa, armchair, or side chair in a seating arrangement to hold food, drinks, books, glasses, phones, or other small items. The table also be used next to a dining table, bathtub, toilet, desk, bed, etc. to hold accessories such as soaps and linens. A retailer who sells plates can use the table base 100 to display plates in multiple retail environments or at trade shows.

Figure 2:
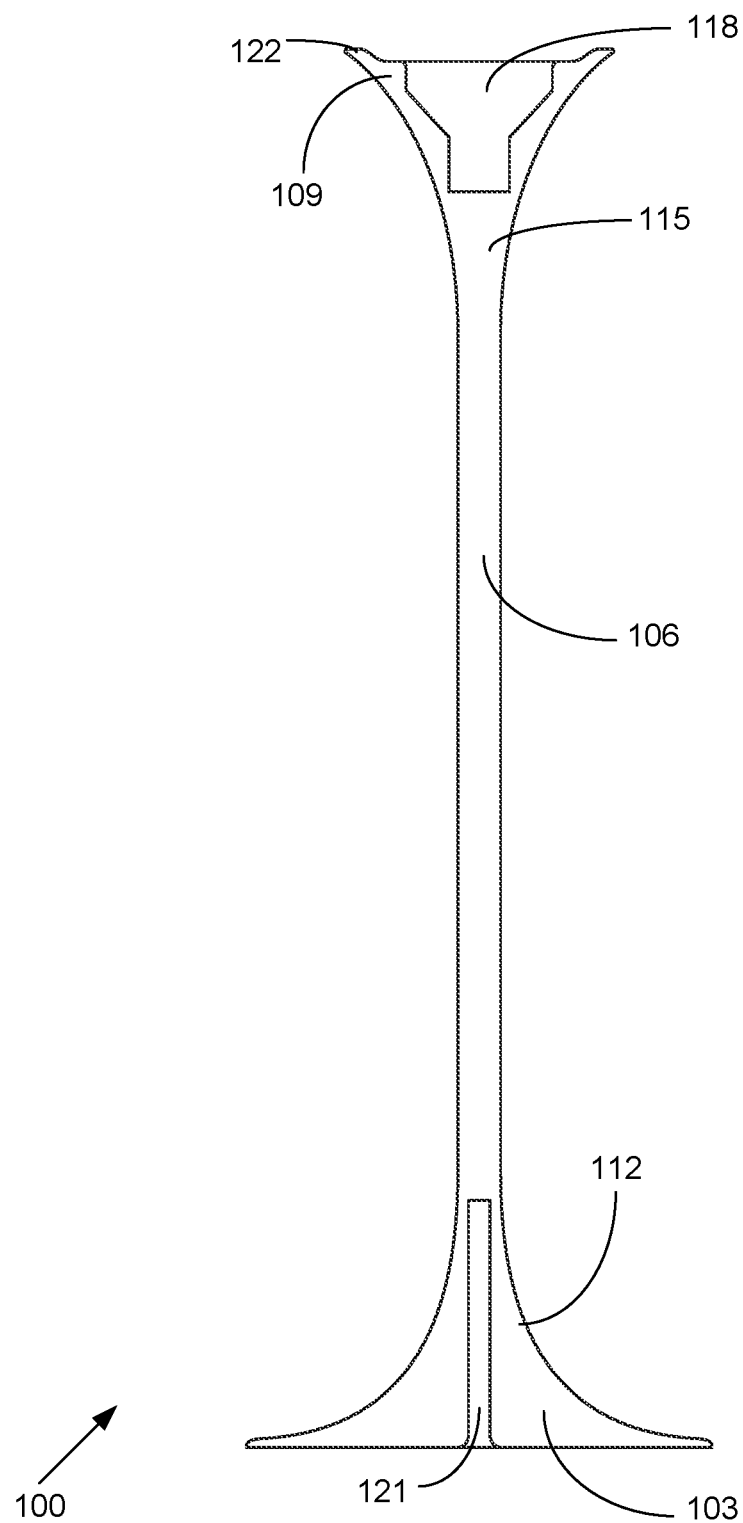
FIG. 2 is a side cross-sectional view of the table base of FIG. 1 according to one embodiment of the present disclosure.

FIG. 2 corresponds to a side cross-sectional view of the table base 100 according to one embodiment. FIG. 2 better illustrates one example of a recessed cavity 118 configured to attach and retain a suction cup via form fit. Additionally, FIG. 2 shows a recessed cavity 121 in the bottom surface portion 103 of the table base 100. The recessed cavity 121 is configured to retain a stake, which in turn can be used to stabilize the table base 100 when the table base 100 is situated atop an earth surface.

For example, the top diameter of the top surface portion 109 may be approximately 120 mm or another value. The recessed cavity 118 may progress from a diameter of 70 mm or another value for a depth of 11 mm or another value, to a diameter of 66 mm or another value for a tapered depth of 21 mm or another value, to a diameter of 27 mm or another value for a depth of 24 mm or another value. A lip 122 of the top surface portion 109 may be a thickness of 3.5 mm or another value.

For example, the diameter of the elongated shaft 106 may be 20 mm or another value, and a height of the table base 100 may be 720 mm or another value. A height between the bottom surface portion 103 and region 112 may be 104 mm or another value. The diameter of the recessed cavity 121 may be 10 mm or another value. The bottom diameter of the bottom surface portion 103 may be 209 mm or another value. In various examples, the bottom surface portion 103 may have a larger diameter in outer cross-section than the top surface portion 109. The bottom surface portion 103, the top surface portion 109, and the elongated shaft 106 may be circular or approximately circular in outer cross-section, except for any surface embellishments.

Figure 3:
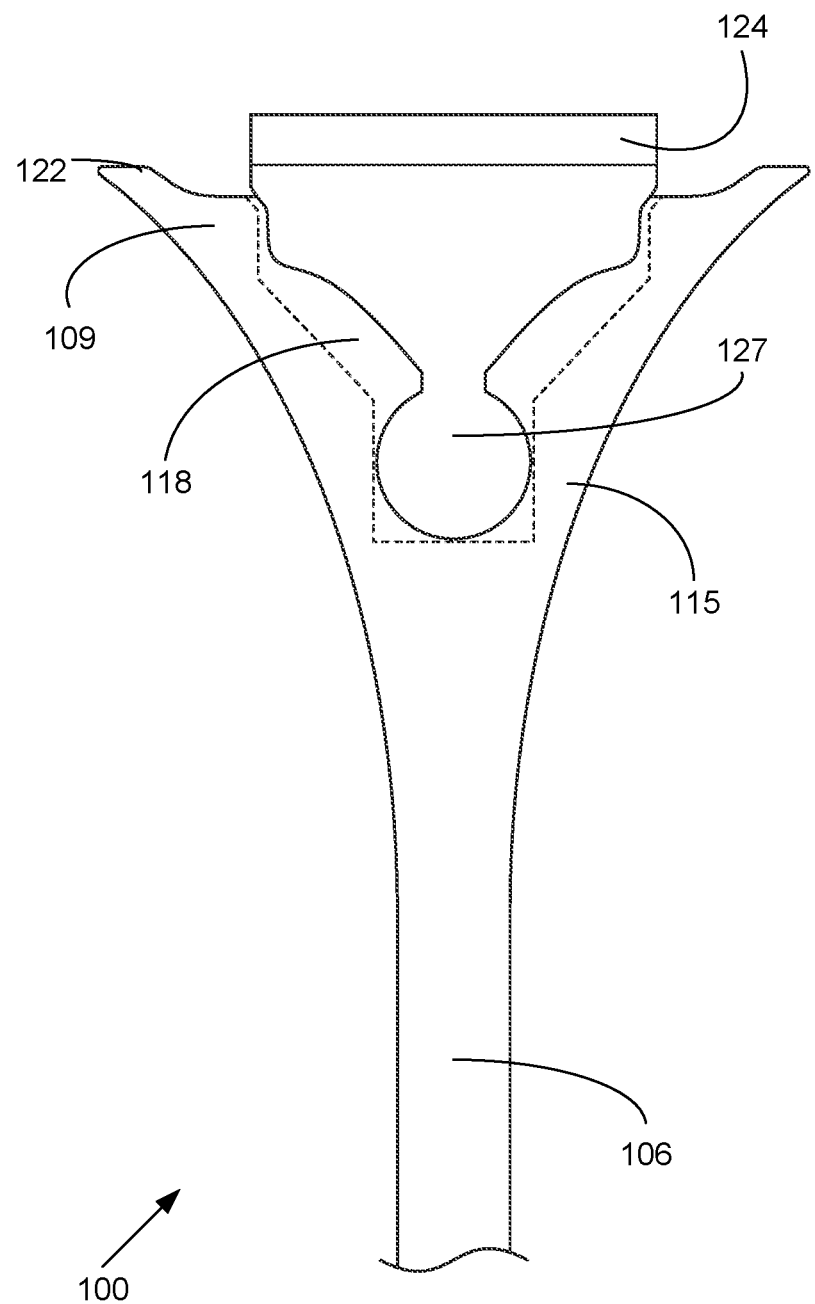
FIG. 3 depicts the insertion of a suction cup in the table base of FIG. 1 according to one embodiment of the present disclosure.

FIG. 3 shows the insertion of a suction cup 124 in the matching recessed cavity 118 of the table base 100 according to one embodiment. The suction cup 124 may have a solid plastic stem 127 as the retainage element. For example, the suction cup 124 may comprise a suction cup base RAP-B-224-2U from RAM MOUNT or similar suction cup 124. The suction cup 124 may be formed of rubber, silicone, or a similar synthetic suction cup 124 with an attached central stem 127 as a retainage element.

Figure 4:
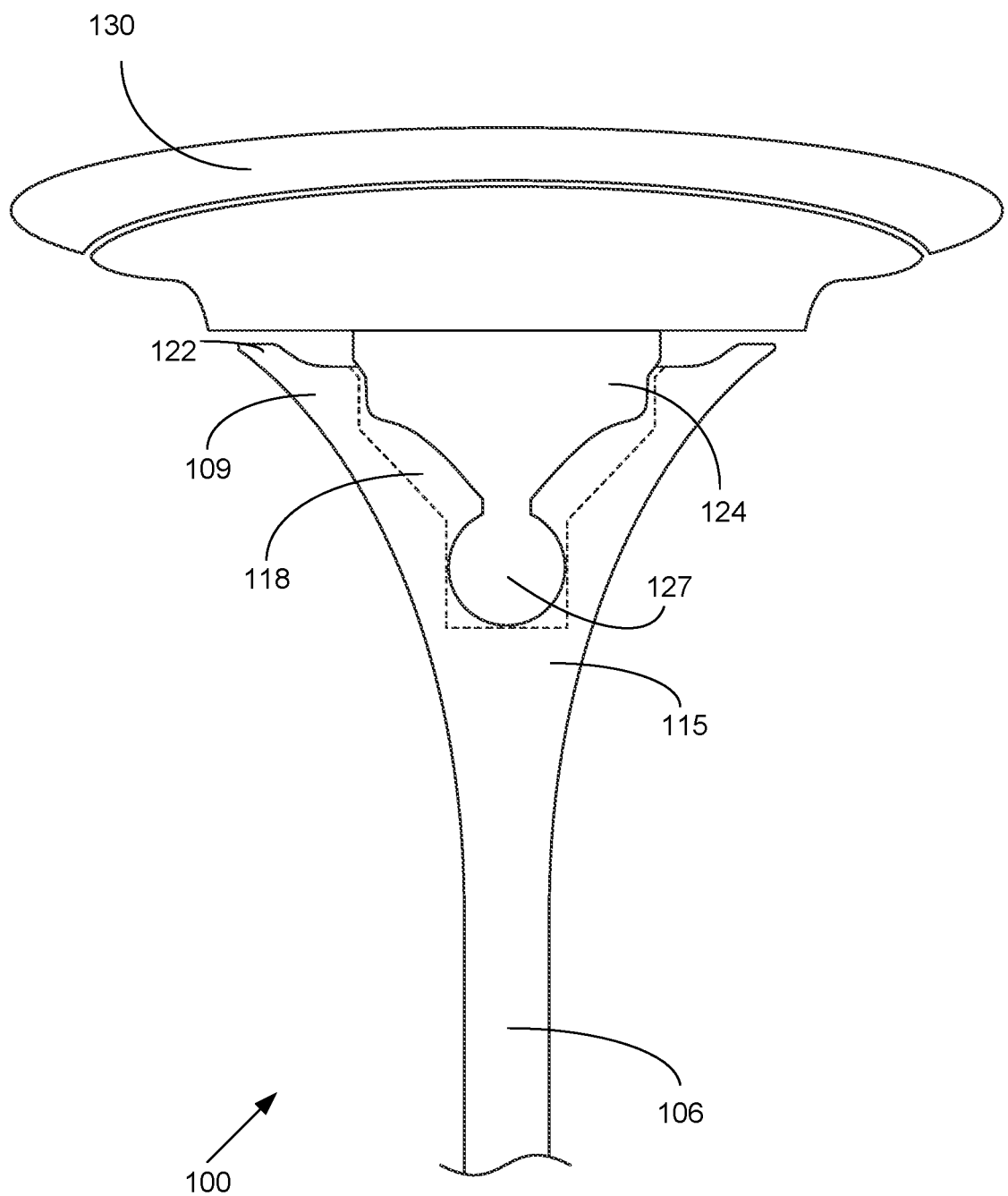
FIG. 4 depicts a plate retained by the suction cup of FIG. 3 in the table base of FIG. 1 according to one embodiment of the present disclosure.

FIG. 4 shows a plate 130 attached to the suction cup 124 in the table base 100 according to one embodiment. In various examples, the suction cup 124 may fan outward in different diameters to provide support and attachment for varying sizes of plates 130.

Figure 5:
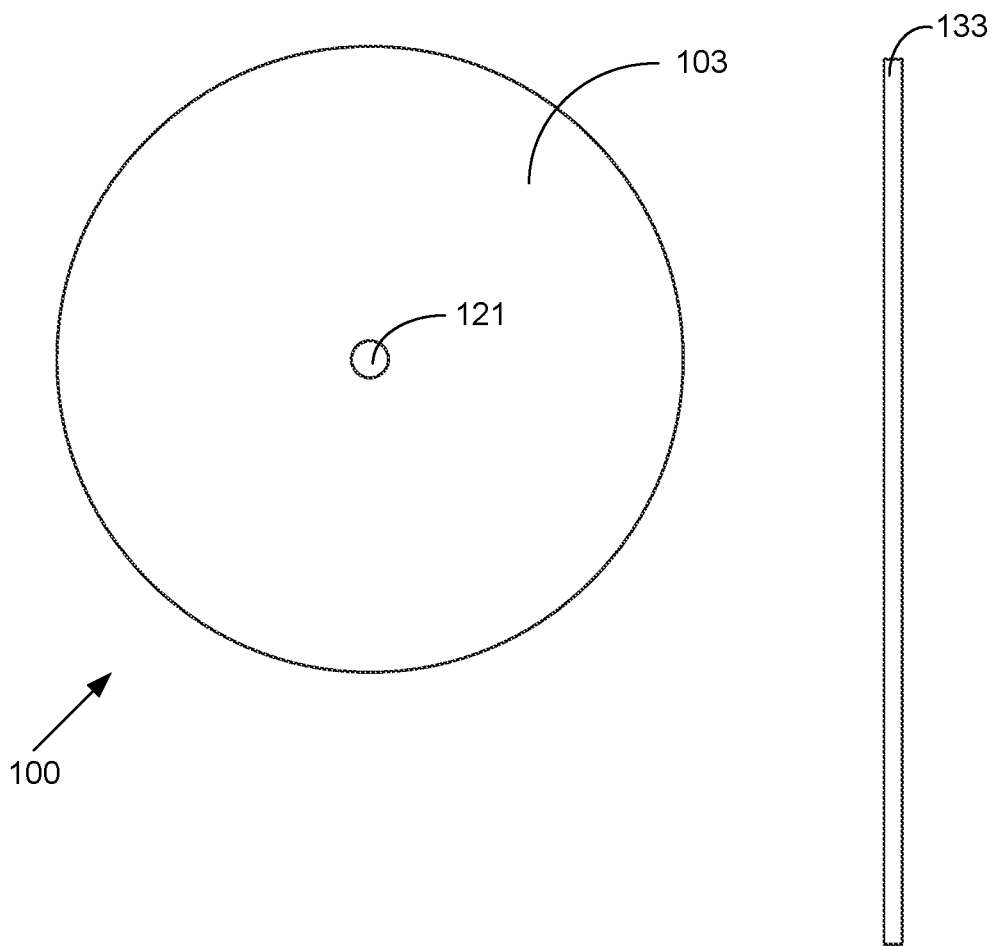
FIG. 5 depicts a bottom end view of the table base of FIG. 1, showing a recessed cavity in the bottom surface portion of the table base of FIG. 1, along with a corresponding stake for insertion in the recessed cavity, according to one embodiment of the present disclosure.
Figure 6:
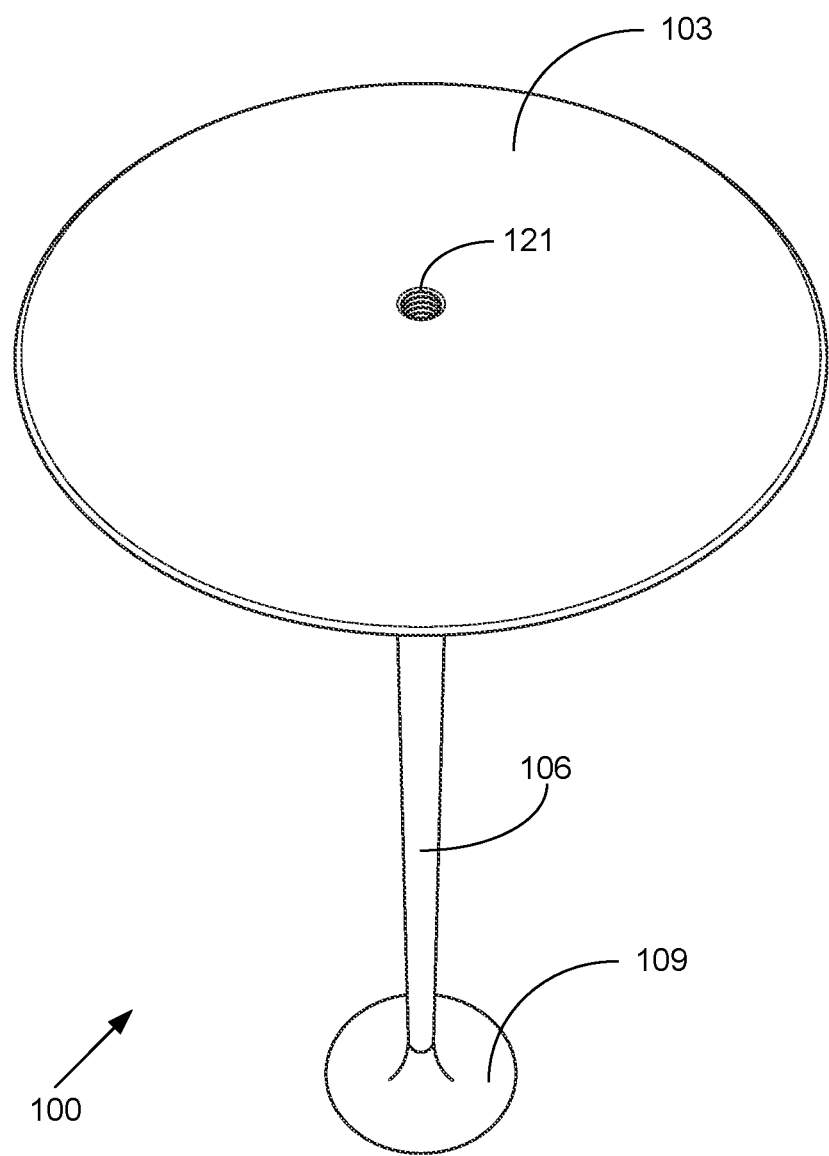
FIG. 6 is a perspective view of the bottom surface portion of the table base of FIG. 1, showing the recessed cavity in the bottom surface portion, according to one embodiment of the present disclosure.

In various embodiments, the table base 100 has an integral anchorage for outdoor events. FIG. 5 shows a bottom end view of the table base 100 according to one embodiment. A recessed cavity 121 is in the bottom surface portion 103 of the table base 100 and a corresponding stake 133 is provided. FIG. 6 shows a perspective view of the bottom surface portion 103 of the table base 100 including the recessed cavity 121 according to one embodiment. For example, the table base 100 may include one or more recessed cavities 121 on the bottom of the bottom surface portion 103 to retain one or more downwardly protruding stakes 133 so that the table base 100 can be placed securely on the grass, sand, or bare dirt outside for outdoor parties and events.

In one embodiment, the stake 133 corresponds to a rod that is at least partially threaded, and the recessed cavity 121 corresponds to a threaded hole in the bottom surface portion 103. A portion of the rod may thus be threaded into the threaded hole in order to anchor the stake 133. Although the example of FIG. 6 depicts the recessed cavity 121 as a threaded hole, the recessed cavity 121 may be non-threaded in other examples. In another example, a stake 133 may snap into a force-fit hole in the bottom surface portion 103 of the table base 100. The stake 133 may have one or more threaded ridges in order to be turned into and engage the soil. In some embodiments, the stake 133 may be embedded or hidden into the table base 100 and extended outwardly by rotation to be placed in an operational position. Likewise, the stake 133 may be moved inwardly into a storage position within the table base 100 by opposite rotation.

In one example, the portion of the stake 133 that fits into the recessed cavity 121 may be 8 mm in diameter or another value. The length of the stake 133 may be 30 mm or another value.

In one embodiment, the table base 100 has height of 24" in order to function ergonomically as a side table next to an industry-standard-height chair, bench, or sofa. The table base 100 may weigh from 8 to 10 pounds, or a heavier weight. The diameter and weight of the table base 100 will act as a counterbalance to a glazed ceramic or porcelain salad or dinner plate 130 between 8" and 12" diameter, or another diameter. The average weight of these plates 130 ranges from 1.5 to 3.5 pounds. The diameter of the table base 100 may be between eight and nine inches, or another diameter.

Figure 7:
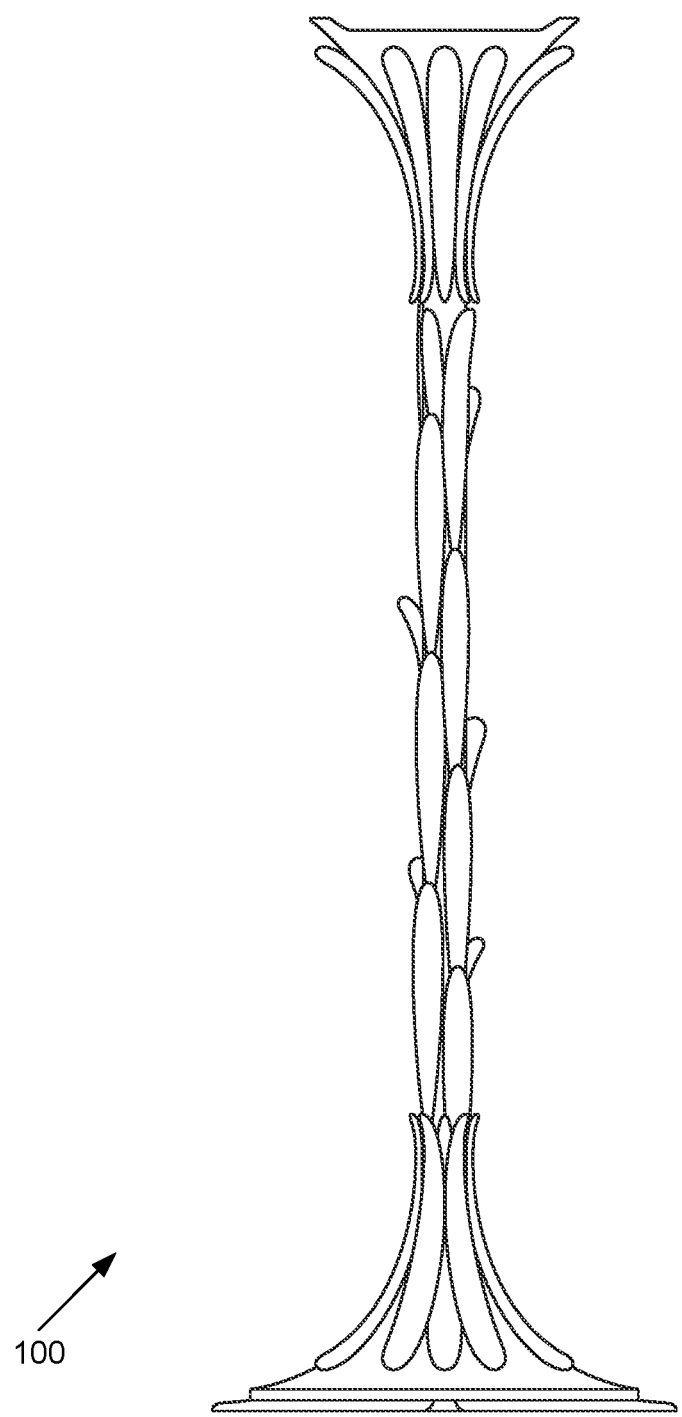
FIG. 7 is a side view of a table base having a first surface embellishment according to one embodiment of the present disclosure.
Figure 8:
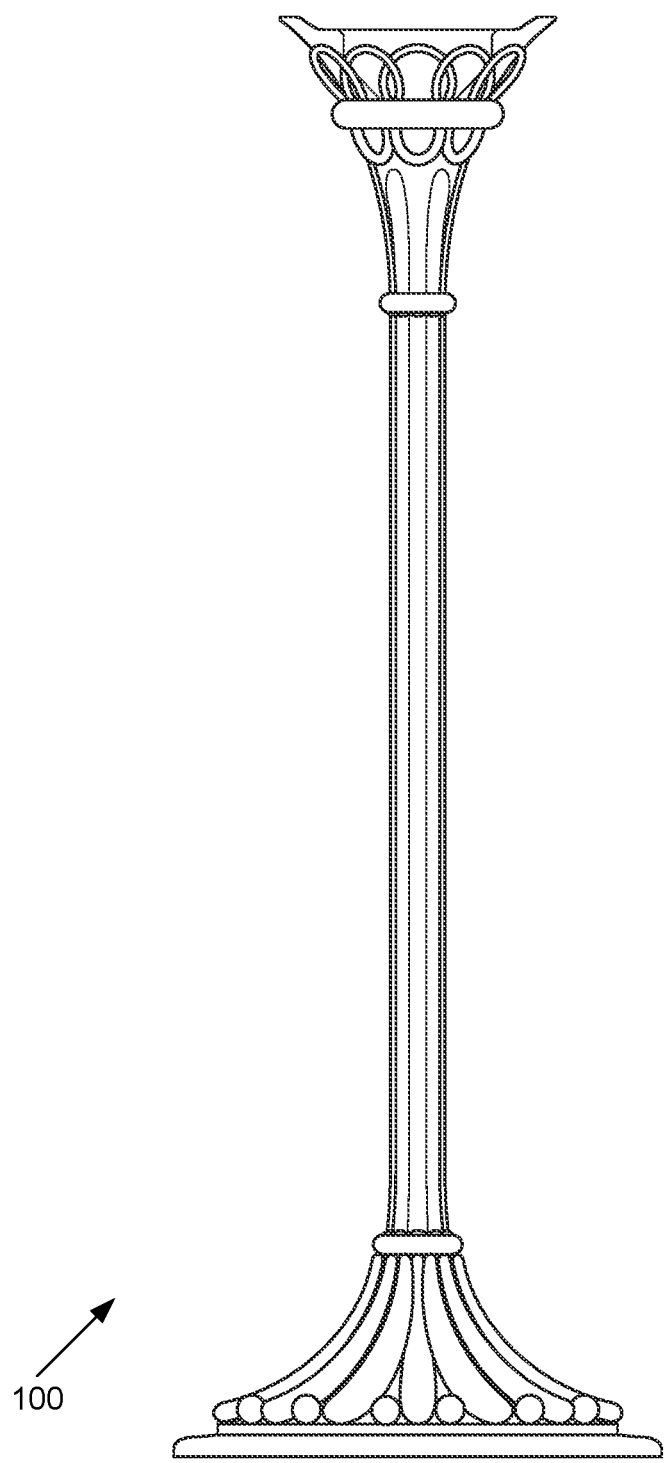
FIG. 8 is a side view of a table base having a second surface embellishment according to one embodiment of the present disclosure.

In various embodiments, the table base 100 may include a variety of surface embellishments. FIG. 7 and FIG. 8 show example surface embellishments according to various embodiments. For example, the surface embellishment shown on the table base 100 of FIG. 7 may correspond to a leafy or floral motif, while the surface embellishment shown on the table base 100 of FIG. 8 corresponds to a fluted column.

In one embodiment, the table base 100 is formed of solid cast aluminum. The surface of the table base 100 may be coated with a powder-coated finish. Alternatively, the table base 100 may be formed of another metal such as solid brass or steel or from a material such as stone or concrete. If lighter materials are used (e.g., wood, resin, or hollow metal), the table base 100 may incorporate one or more cavities for holding a ballast such as water, sand, rock, etc. In one embodiment, the table base 100 may include a recess for adding a weight of metal or another material.

Figure 9:
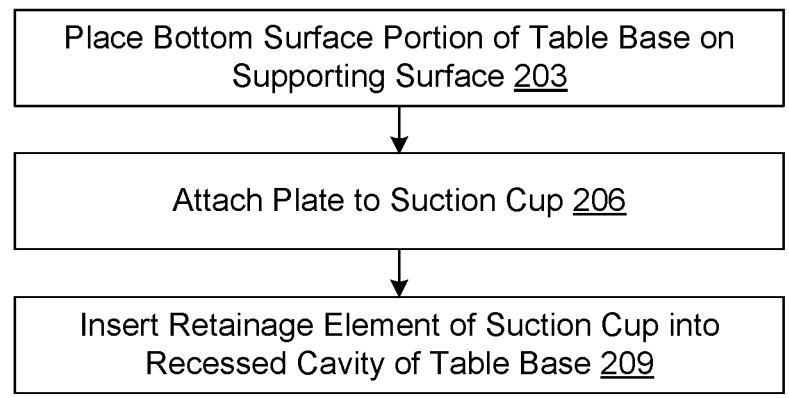
FIG. 9 is a flowchart illustrating a method of use for the table base of FIG. 1 according to various embodiments of the present disclosure.

Referring next to FIG. 9, shown is a flowchart 200 that provides one example method of use for the table base 100 (FIG. 1). It is understood that the flowchart 200 provides merely an example of the many different types of functional arrangements relating to a method of use for the table base 100.

Beginning with box 203, the user places a bottom surface portion 103 (FIG. 1) of the table base 100 onto a supporting surface. For example, the user may place the bottom surface portion 103 of the table base 100 onto a floor surface, such as carpet, tile, wood, vinyl, laminate, concrete, or other flooring material. The weight and shape of the table base 100 are chosen to resist tilting and to remain stable on the floor surface.

In other scenarios, the user may wish for the table base 100 to be used upon an earth surface, such as soil, gravel, or turf. In such scenarios, the user may attach a stake 133 (FIG. 5) to the bottom surface portion 103 of the table base 100. The stake 133 may be removable, or the stake 133 may be retracted inside recessed cavity 121 (FIG. 5) of the table base 100 and a portion of the stake 133 may be extended outwardly from the recessed cavity 121 to protrude from the bottom of the bottom surface portion 103 of the table base 100. To attach the stake 133 to the earth surface, the user may simply press down on the table base 100, thereby transferring downward force to the stake 133 so that the stake 133 engages with the earth surface. In another example, the user may rotate the table base 100 to engage the stake 133 with the earth surface. In other words, the user may effectively screw the table base 100 to the earth surface by engaging the earth surface with one or more threaded ridges on the exterior of the stake 133.

In other examples, the bottom surface portion 103 may include one or more through holes for externally attaching one or more stakes 133 through the bottom surface portion 103. Also, in some cases, the bottom surface portion 103 includes a ballast cavity for a ballast such as a metallic weight, water, sand, gravel, etc.

In box 206, a user attaches a plate 130 (FIG. 4) to a suction side of a suction cup 124 (FIG. 3). For example, the user may place the plate 130 upside down on a soft surface, then apply the suction cup 124 to the center of the plate. A twisting action may then lock the suction cup 124 into place.

In box 209, the user inserts a retainage element of the suction cup 124 into the recessed cavity 118 (FIG. 2) in the top surface portion 109 (FIG. 1) of the table base 100. For example, the retainage element may correspond to a solid plastic stem 127 (FIG. 3) of the suction cup 124. The suction cup 124 may then be attached to the top surface portion 109 of the table base 100. In some embodiments, the suction cup 124 may be pre-attached to the table base 100. In some examples, the suction cup 124 is retained by form fit of the plastic stem 127 of the suction cup 124 into the recessed cavity 118. In other examples, the suction cup 124 may be retained by an adhesive or a mechanical fastener. While in the flowchart 200 the plate 130 is attached to the suction cup 124 before the suction cup 124 is inserted into the table base 100, in other examples, the plate 130 may be attached to the suction cup 124 after the suction cup 124 is inserted into the table base 100.

Consequently, the plate 130 is both supported and retained by the table base 100 using the suction cup 124. One or more items may then be placed atop the plate 130, such as a floral vase, a drink cup or glass, or other items. If the user so desires, the plate 130 can be removed and exchanged for a different plate 130. Thereafter, the flowchart 200 ends.

Although the flowchart 200 depicts a specific order of execution, it is understood that the order of execution may differ from that which is depicted. For example, the order of execution of two or more blocks may be scrambled relative to the order shown. Also, two or more blocks shown in succession in flowchart 200 may be executed concurrently or with partial concurrence. Further, in some embodiments, one or more of the blocks shown in flowchart 200 may be skipped or omitted.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A table base, comprising:
    a bottom surface portion configured to contact an earth surface, the bottom surface portion comprising a stake extending outwardly from the bottom surface portion into the earth surface to anchor the table base;
    a top surface portion configured to support a smooth removable surface;
    a suction cup with a stem attached to an integrally-formed recessed cavity of the top surface portion, wherein the integrally-formed recessed cavity is tapered such that is has a larger diameter at a top portion and a smaller diameter at a bottom portion for receiving the stem of the suction cup, the suction cup being configured to removably retain the smooth removable surface; and
    an elongated shaft attached to the top surface portion and the bottom surface portion, the elongated shaft being tapered inward from the bottom surface portion and tapered outward to the top surface portion.

2. The table base of claim 1, wherein the smooth removable surface comprises a china plate, a glass tabletop surface, or a polished stone tabletop surface.

3. The table base of claim 1, wherein the bottom surface portion, the top surface portion, and the elongated shaft are circular in outer cross-section.

4. The table base of claim 1, wherein the bottom surface portion has a larger diameter in outer cross-section than the top surface portion.

5. The table base of claim 1, wherein the bottom surface portion includes an integral anchorage for attaching the stake to the bottom surface portion.

6. The table base of claim 1, wherein the stake is threaded and wherein the bottom surface portion includes a threaded hole for attaching the stake in a bottom of the bottom surface portion.

7. The table base of claim 1, wherein the bottom surface portion includes a recess for adding a removable weight.

8. The table base of claim 1, wherein the bottom surface portion includes a ballast cavity.

9. A table base, comprising:
    a bottom surface portion configured to contact a supporting surface;
    a top surface portion comprising an integrally-formed recessed cavity for attaching and retaining a suction cup to support and retain a smooth removable surface; and
    an elongated shaft attached to the top surface portion and the bottom surface portion, the elongated shaft being tapered inward from the bottom surface portion and tapered outward to the top surface portion; wherein the suction cup has a stem; and wherein the integrally-formed recessed cavity is tapered such that is has a larger diameter at a top portion and a smaller diameter at a bottom portion for receiving the stem of the suction cup.

10. The table base of claim 9, wherein the smooth removable surface comprises a plate.

11. The table base of claim 9, wherein a lower external surface of the top surface portion, an upper external surface of the bottom surface portion, and a surface of the elongated shaft integrate one or more surface embellishments.

12. The table base of claim 9, wherein the table base is formed of solid cast aluminum.

13. The table base of claim 9, wherein the supporting surface is a floor.

14. The table base of claim 9, wherein the supporting surface is an earth surface.

15. A method for supporting a plate by a table base, comprising:
    placing a bottom surface portion of the table base on a supporting surface; and
    attaching the plate to a top surface portion of the table base via a suction cup anchored in an integrally-formed recessed cavity of the top surface portion; wherein the suction cup has a stem; and wherein the integrally-formed recessed cavity is tapered such that is has a larger diameter at a top portion and a smaller diameter at a bottom portion for receiving the stem of the suction cup.

16. The method of claim 15, wherein the table base further comprises an elongated shaft connecting the bottom surface portion and the top surface portion, the elongated shaft being tapered inward from the bottom surface portion and tapered outward to the top surface portion.

17. The method of claim 15, further comprising:
    attaching the plate to the suction cup before the suction cup is anchored in the integrally-formed recessed cavity; and inserting a retainage element of a non-contact surface of the suction cup into the integrally-formed recessed cavity in order to anchor the suction cup.

18. The method of claim 15, further comprising inserting a stake into a hole on a bottom of the bottom surface portion so that a portion of the stake extends outwardly from the bottom, and wherein placing the bottom surface portion of the table base on the supporting surface further comprises inserting the portion of the stake extending outwardly from the bottom into an earth surface to anchor the table base.

19. The method of claim 18, wherein inserting the portion of the stake extending outwardly from the bottom into the earth surface to anchor the table base further comprises rotating the table base to engage the earth surface via one or more threaded ridges of the portion of the stake.

* * * * *